US009013694B2

(12) United States Patent
Sevillano Reyes et al.

(10) Patent No.: US 9,013,694 B2
(45) Date of Patent: Apr. 21, 2015

(54) SYSTEM AND METHOD FOR MEASURING A WAVELENGTH-RESOLVED STATE OF POLARIZATION OF AN OPTICAL SIGNAL

(71) Applicants: Pascual Sevillano Reyes, Saragossa (ES); Jesus Subías Domingo, Saragossa (ES); Javier Pelayo Zueco, Saragossa (ES); Carlos Heras Vila, Saragossa (ES); Asier Villafranca Velasco, Saragossa (ES); Francisco Manuel Lopez Torres, Saragossa (ES)

(72) Inventors: Pascual Sevillano Reyes, Saragossa (ES); Jesus Subías Domingo, Saragossa (ES); Javier Pelayo Zueco, Saragossa (ES); Carlos Heras Vila, Saragossa (ES); Asier Villafranca Velasco, Saragossa (ES); Francisco Manuel Lopez Torres, Saragossa (ES)

(73) Assignees: Aragon Photonics Labs S.L.U., Zaragoza (ES); Fibercom S.L., Zaragoza (ES)

( * ) Notice: Subject to any disclaimer, the term of this patent is extended or adjusted under 35 U.S.C. 154(b) by 154 days.

(21) Appl. No.: 13/899,132

(22) Filed: May 21, 2013

(65) Prior Publication Data

US 2013/0314706 A1 Nov. 28, 2013

(30) Foreign Application Priority Data

May 22, 2012 (ES) .................. 201230767

(51) Int. Cl.
 *G01J 4/04* (2006.01)
 *G01J 9/04* (2006.01)
 *G01J 3/44* (2006.01)
(52) U.S. Cl.
 CPC ................. *G01J 4/04* (2013.01); *G01J 3/4412* (2013.01); *G01J 9/04* (2013.01)

(58) Field of Classification Search
 CPC ...................................... G01J 4/04; G01J 9/04
 USPC ........................................................ 356/364
 See application file for complete search history.

(56) References Cited

U.S. PATENT DOCUMENTS

| | | | | |
|---|---|---|---|---|
| 6,498,886 | B1* | 12/2002 | Sobiski et al. | 385/122 |
| 6,618,129 | B2* | 9/2003 | Dries et al. | 356/73 |
| 6,941,081 | B2* | 9/2005 | Moeller et al. | 398/205 |
| 2002/0044282 | A1* | 4/2002 | Moeller et al. | 356/369 |
| 2002/0060785 | A1* | 5/2002 | Dries et al. | 356/73 |

FOREIGN PATENT DOCUMENTS

EP 1113250 A1 7/2001

OTHER PUBLICATIONS

Official Action dated Feb. 4, 2014 with respect to corresponding Spanish Patent App. No. 201230767.

(Continued)

*Primary Examiner* — Roy M Punnoose
(74) *Attorney, Agent, or Firm* — Vedder Price, P.C.

(57) ABSTRACT

The present invention relates to a system and method for measuring a wavelength-resolved state of polarization, for calculating differential group delay of an optical signal under analysis (1) by means of taking multiple measurements of the spectrum of the signal under analysis (1) with spectral filtering means (3) with an optical output the power of which depends on the polarization of the input. The polarization at the input of the spectral filtering means (3) is modified by means of a polarization transformer (2) which sequentially selects a plurality of output states of polarization. The spectral filtering means (3) can comprise a filter based on stimulated Brillouin scattering amplification (10) simultaneously combining wavelength discrimination and polarization discrimination.

19 Claims, 4 Drawing Sheets

(56) References Cited

OTHER PUBLICATIONS

Moller, L. et al. "SOP and PMD monitoring with WDM polarimeter." Electronics Letters, 20020606 IEE Stevenage, GB Jun. 6, 2002 vol. 38, No. 12. pp. 583-585 XP006018273.

van Deventer, Oskar and Boot, Andre J. "Polarization Properties of Stimulated Brillouin Scattering in Single-Mode Fibers." Journal of Lightwave Technology. Apr. 1, 1994 IEEE Service Center, New York, NY Apr. 1, 1994, vol. 12, No. 4, pp. 585-590 XP000470354 ISSN 0733-8724.

Thevenaz, L. et al. "All-Optical Polarization Control Through Brillouin Amplification." Optical Fiber communication/National Fiber Optic Engineers Conference, 2008. OFC/NFOEC 2008. Conference on, Feb. 24, 2008 IEEE, Piscataway, NJ, USA Feb. 2, 2008 vol. pp. 1-3 ISBN 978-1-55752-8568; XP031391468 ISBN 1-55752-856-X.

* cited by examiner

SYSTEM AND METHOD FOR MEASURING A WAVELENGTH-RESOLVED STATE OF POLARIZATION OF AN OPTICAL SIGNAL

FIELD OF THE INVENTION

The present invention applies to the field of optical signal characterization, and particularly to the measurement of the differential group delay of an optical signal.

BACKGROUND OF THE INVENTION

Polarization Mode Dispersion (PMD) is a phenomenon typical of optical fibers in which a slight birefringence in the means generates two different transmission states along the fiber. Its origin is normally due to the lack of circularity generated when manufacturing optical fibers, this effect increasing during the installation and wiring thereof. The delay between the two axes of polarization of the signal, produced by the difference in the effective refractive index observed by each polarization is defined as Differential Group Delay (DGD).

The PMD of a communication link can result in optical pulse spreading and deformation and in transmission errors, limiting the data rate of said link, so characterizing it is vital for determining the features of the link.

The evolution experienced by the polarization vector of a signal going through an optical fiber is wavelength-dependent and changing over time. The greater the PMD, the greater differentiation is observed in the State of Polarization (SOP) between two frequency components of a signal having the same polarization at its source, being able to be observed as a larger separation of the polarization vectors thereof in Stokes sphere.

The DGD can thus be obtained by splitting the angle $\phi$ formed by the polarization vectors of two spectral components of a signal between the difference in wavelength of said components. If the polarization vector of the frequency-resolved signal is referred to as $S(\omega)$, and the vector defined by the main states of birefringence of a system under analysis is referred to as $\Omega$, the following is obtained:

$$\phi = \sin^{-1}\{(S(\omega_1) \times \Omega) \times (S(\omega_2) \times \Omega)/[|S(\omega_1) \times \Omega||S(\omega_2) \times \Omega|]\}$$

$$dS/d\omega = \Omega \times S$$

$$DGD = \phi/(\omega_2 - \omega_1)$$

$\Omega$ is by definition the normal vector of the plane of rotation of the system, and it is unknown. In the case in which rotation occurs about a maximum circle, obtaining the angle $\phi$ is simplified to:

$$\phi = \sin^{-1}\{(S_1 \times S_1)/(|S_1||S_2|)\}$$

In standard fiber systems the angle of rotation $\Omega$ is changing for each wavelength, and its influence on a signal going through the system is defined by the overall path that the polarization vector takes along the Stokes sphere.

The measurement of frequency-resolved SOP is therefore of great interest for characterizing PMD and DGD of optical communication links and systems.

Various methods and systems for taking said measurement are known. For example, EP 1,113,250 A1 discloses a method and system for determining the PMD of a device under test, in which a coherent light beam is split into two paths. The first beam goes through a polarization transformer and the device under test, and the second beam goes through a reference path. The superposition of the two resulting beams allows characterizing the Jones matrix of the device.

U.S. Pat. No. 6,563,590 B2 and U.S. Pat. No. 6,885,783 B2 disclose two examples based on optoelectronic heterodyne filters. Spectral measurements are taken for four states of a polarization transformer placed at the output of an internal laser of the heterodyne filter to characterize the signal.

In all cases, the precision of systems for measuring DGD is limited by the birefringence of the spectral filter, the conversion of the optoelectronic system, and the resolution of the filter, so there is a need in the state of the art for a system and method for measuring wavelength-resolved SOP with high precision and resolution.

Systems and methods with sufficient resolution for simultaneously measuring the SOP of several signals transported by a Dense Wavelength Division Multiplexing (DWDM) system with very small gaps between channels are particularly necessary. The resolution necessary for achieving this objective is unattainable with the devices known in the state of the art.

BRIEF DESCRIPTION OF THE INVENTION

The present invention solves the problems described above by means of a system and method for measuring a wavelength-resolved state of polarization of an optical signal under analysis in which the output of a polarization transformer serves as the input of a tunable spectral filtering system the optical gain of which is dependent on the polarization at the input thereof. The measurement of the wavelength-resolved state of polarization (SOP) is taken from a plurality of spectral measurements of the input signal for predefined output states of polarization of the polarization transformer. The wavelength-resolved state of polarization of the signal under analysis allows calculating the differential group delay of the signal and the polarization mode dispersion of an optical communications element in a precise and robust manner.

Unlike in the case of optoelectronic heterodyne receivers, the output of the spectral filtering system is optical, so it is only necessary to transform the measurement signals into electrical signals in the optical power detector, improving the resulting signal-to-noise ratio. Additionally, by performing polarization transformation before spectral filtering, the errors derived from the birefringence of the filtering system are avoided. Finally, by taking the measurements sequentially in a controlled manner, power splits are avoided, also thus improving the signal-to-noise ratio of the measurement. These three factors are symbiotically combined, resulting in a robust, precise, and highly sensitive method and system. Likewise, the resolution that the present invention allows attaining as a result of the elements and steps forming it is sufficient for measuring the SOP of multiple signals transported simultaneously in DWDM systems.

A first aspect of the invention relates to a system for measuring the wavelength-resolved SOP of an optical signal under analysis, comprising optical spectral filtering means, with an optical output dependent on a state of polarization at the input of said spectral filtering means. The input of the spectral filtering means is operatively connected to a polarization transformer, whereas the output of said spectral filtering means is connected to an optical power detector. The optical power detector and the filtering means are synchronized for measuring optical power distributions of the input signal of the filtering means in a frequency range.

Control means are connected to the remaining elements of the system (spectral filtering means, polarization transformer and power detector), said control means being configured to coordinate taking a plurality of spectral measurements of a signal under analysis, and each spectral measurement corresponding to an output SOP of the polarization transformer. The plurality of spectra measured as a function of the output SOP of the polarization transformer are sent to evaluation means, configured for calculating the wavelength-resolved SOP of the signal under analysis. Said calculation is performed taking into consideration that each point of a spectrum is the projection of the wavelength associated with said point along an axis of the Stokes sphere, and performing the reconstruction of the SOP of said wavelength from the plurality of measured projections.

In a first preferred option, the input polarization-dependent optical filtering means are implemented by means of a linear polarizer at the input of said filtering means, followed by a homodyne optical spectral filter, such as a diffraction grating for example.

In a second preferred option, intended for achieving greater resolution of the measurement of wavelength-resolved SOP, the optical spectral filtering means comprise a tunable laser source, configured for generating a variable wavelength pumping signal, and a Brillouin filter configured for filtering the signal under analysis by means of Brillouin interaction with the variable wavelength pumping signal. The Brillouin effect interaction is highly dependent on the relation between the polarization of the pumping signal and of the amplified signal (in this case, the signal under analysis), so it acts simultaneously as a polarization discriminating element and optical filtering element. The Brillouin interaction furthermore takes place in a very narrow-bandwidth, so the resulting spectra have a high resolution.

The Brillouin filter preferably comprises a reel of optical fiber where the Brillouin effect interaction takes place and where the signal under analysis and the pumping signal are introduced at opposite ends, using an optical circulator to that end. Likewise, at the end where the signal under analysis is introduced, the filter comprises an optical isolator configured for allowing the passage of the signal under analysis to the filtering means, and preventing the output of the pumping signal in the direction from where the signal under analysis comes.

Two preferred configurations of the polarization transformer in the case of the use of the Brillouin filter are in turn considered:
  Arranging the polarization transformer such that it transforms the polarization of the signal under analysis.
  Arranging the polarization transformer such that it transforms the polarization of the pumping signal. In this case, two preferred systems are considered: a first system with a single pumping signal the polarization of which is sequentially modified to all the desired states of polarization; and a second system in which two optical fibers are used for providing two pumping signals with orthogonal polarizations.

Also preferably, the system additionally has phase measurement means configured for measuring a wavelength-resolved phase of the signal under analysis obtained from two Brillouin effect-amplified components. The evaluation means are also configured for calculating the SOP of the signal under analysis from a plurality of wavelength-resolved phase measurements for different output SOP of the polarization transformer.

The evaluation means are also preferably configured for eliminating the contribution of power peaks in the spectrum of the signal from the calculation of the wavelength-resolved SOP. In systems of the state of the art with lower resolution, the contribution of said power peaks affects a greater range of wavelengths close to the peak, reducing the quality of the resulting measurement in said range. This is particularly relevant in the case of amplitude modulation carrier signals and in signals with short and repetitive frames which have associated very narrow and large amplitude peaks in the spectrum.

A second aspect of the invention relates to a method for measuring wavelength-resolved SOP of an optical signal under analysis which comprises:
  Sequentially selecting pluralities of states of polarization predefined for the output of a polarization transformer. The output of the polarization transformer is operatively connected to the input of optical spectral filtering means, the response of which depends on the SOP of said input. The output of the filtering means is also an optical signal.
  Measuring a plurality of spectral power distributions associated with said output SOP of the transformer. Said measurement is performed by means of the spectral filtering means in combination with an optical power detector.
  Calculating the wavelength-resolved SOP of the signal under analysis from the measured spectral power distributions. As explained, the calculation of the wavelength-resolved SOP is performed taking into consideration that the spectra measured are projections of the polarization of the signal in the Stokes sphere.

In a preferred implementation of the method, the step of optical spectral filtering is performed by means of polarization discrimination by means of a linear polarizer, followed by an optical homodyne filter.

In another preferred alternative implementation, the optical spectral filtering is performed by means of Brillouin effect interaction according to the following steps:
  generating at least one variable wavelength pumping signal in a laser source. Using either a single pumping signal or two pumping signals with orthogonal polarizations is contemplated;
  filtering the signal under analysis by means of Brillouin effect interaction with the at least one pumping signal.

In the case of the method that uses Brillouin filtering, there are two preferred alternatives for the polarization transformer:
  Transforming the state of polarization of the signal under analysis.
  Transforming the state of polarization of the pumping signal (or signals).

The method preferably comprises taking a plurality of wavelength-resolved phase measurements of the signal under analysis by means of Brillouin filtering, each measurement being associated with an output state of polarization of the polarization transformer, and using said phase measurements for calculating the wavelength-resolved SOP of the signal under analysis.

The method also preferably comprises eliminating the contribution of power peaks of the spectrum of the signal from the calculation of the SOP of the signal under analysis, which masks the measurement of the SOP of adjacent spectral regions in methods with lower spectral resolution.

The described system and method therefore allow taking a measurement of the wavelength-resolved SOP with high precision and robustness, also cancelling out the harmful effect of power peaks in the spectrum of the signal. The described system and method additionally allow measuring PMD in communication links with low transmission rates, which cannot be done with systems of the state of the art. This and other advantages of the invention will become apparent in light of the detailed description thereof.

BRIEF DESCRIPTION OF THE DRAWINGS

For the purpose of aiding to better understand the features of the invention according to a preferred practical embodiment thereof and for complementing this description, the following illustrative and non-limiting figures are attached as an integral part thereof.

DETAILED DESCRIPTION OF THE INVENTION

In this text, the term "comprises" and derivatives thereof (such as "comprising", etc.) must not be understood in an excluding sense, i.e., these terms must not be interpreted so as to exclude the possibility that what is described and defined may include more elements, steps, etc.

In the present text, and for the purpose of simplifying understanding thereof, "Brillouin effect" refers to stimulated Brillouin scattering (SBS) amplification, and "Brillouin filter" refers to any optical spectral filtering element based on said stimulated Brillouin scattering amplification.

In all the embodiments described below, the signal under analysis 1 can be a single channel or a plurality of channels. To calculate the DGD and PMD, it is assumed that the polarization of the signal under analysis 1 is, at origin, constant in the bandwidth of each channel, subsequently being modified by the PMD of a communication device or link located between the source and the system of the invention.

Figure 1:
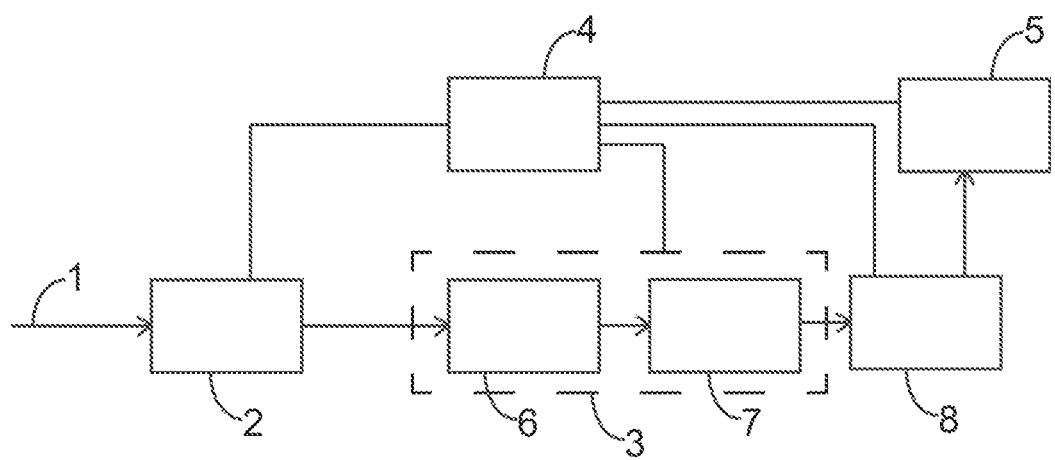
FIG. 1 shows a diagram of a system for measuring a wavelength-resolved state of polarization according to a first particular embodiment of the present invention implemented with a linear polarizer and a coherent optical spectrum analyzer.

FIG. 1 shows a first particular embodiment of the system of the invention based on spectral filtering means comprising a polarizer and an optical homodyne filter. Said embodiment of the system in turn implements a first particular embodiment of the method of the invention as described below.

The system comprises a polarization transformer 2, the input of which is the signal under analysis 1, and the output of which serves as input to a tunable filtering system 3. The filtering means 3 in turn comprise an optical output, the power of which depends on the polarization of the signal at the input of said filtering means 3, the optical output being connected to an optical power detector 8. The optical power detector 8 is connected to evaluation means 5 that perform the calculation of the wavelength-resolved SOP from the measurements of the optical power detector 8. Control means 4 coordinate the operation of the remaining elements of the system, synchronizing the measurement of the optical spectrum of the signal under test 1 for a predefined number of output states of polarization of the polarization transformer 2.

The polarization transformer 2 is an element which allows introducing two delays in a simultaneous and controllable manner between two pairs of non-coplanar axes of birefringence of the Stokes sphere. Said polarization transformer 2 is therefore equivalent to a system formed by a delay plate $\lambda/4$ and a delay plate $\lambda/2$, such that with the relative orientation of both plates, it can be assured that any input polarization vector can be transformed into any output polarization vector. The polarization transformer 2 is implemented in a preferred option by means of a generic polarization transformation system based on piezoelectric elements. Nevertheless, any polarization transformation system known in the state of the art and capable of introducing the mentioned controllable delays in the Stokes sphere is valid for implementing the invention.

The filtering means 3 are formed by a linear polarizer 6 and a tunable homodyne filter 7. The transmittance of the linear polarizer 6 is determined by the angle between the axis of transmission of the linear polarizer 6 and the angle of polarization of the input signal. The tunable homodyne filter 7 can be implemented, for example, by means of a diffraction grating that angularly opens the spectral components of the signal, and a grid which allows a certain frequency range to pass, blocking the rest.

The optical power detector 8 comprises at least one step of transimpedance generating a voltage signal linear to the optical power of the signal striking the detector.

To measure wavelength-resolved SOP, the control means coordinate the measurement of six spectral power distributions for six different projections of the Stokes sphere, obtaining a representation of the polarization vector in a base defined by three axes of said sphere. Spectral measurements are taken particularly for the following combinations of angles with respect to the horizontal of the delay plate $\lambda/2$ and the delay plate $\lambda/4$, respectively:

0°, 0°
0°, 45°
22.5°, 0°

The power distribution of the spectrum is measured for two orthogonal positions of the linear polarizer 6, particularly 0° and 90°, for each of said combinations.

The parameters $S_i$ of the polarization vector in the Stokes sphere are obtained for each wavelength based on the spectra measured for said projections.

Particularly, if the described projections $P_i[a,b,c]$, where a is the angle of the delay plate $\lambda/2$, b the angle of the delay plate $\lambda/4$, and c the angle of the linear polarizer 6, are considered:

$P_1=[0,0,0]; P_2=[0,0,90]; P_3=[0,45,0];$ $P_4=[0,45,90]; P_5=[22.5,0,0]; P_6=[22.5,0,90];$

The expression of the parameters $S_i$ would be:

$S_1=(P_1-P_2)/(P_1+P_2)$ $S_2=(P_3-P_4)/(P_3+P_4)$ $S_3=(P_5-P_6)/(P_5+P_6)$

A minimum power threshold below which the signal-to-noise ratio of the spectral measurement is considered to be too low, eliminating said data from the calculation, can optionally be established. The value of the DGD is obtained as described above, based on the angle formed by the vector S for two frequencies, preferably the most separated frequencies of the analyzed frequency range, and based on the difference between those two frequencies.

It must be observed that other numbers of projections, as well as other angles thereof, can be chosen to reconstruct the polarization vector according to what is known in the state of the art. For example, rotations of the linear polarizer 6 between 0° and 90° can be replaced with a 45° rotation of the delay plate $\lambda/2$, keeping the angle of the linear polarizer 6 fixed.

Figure 2:
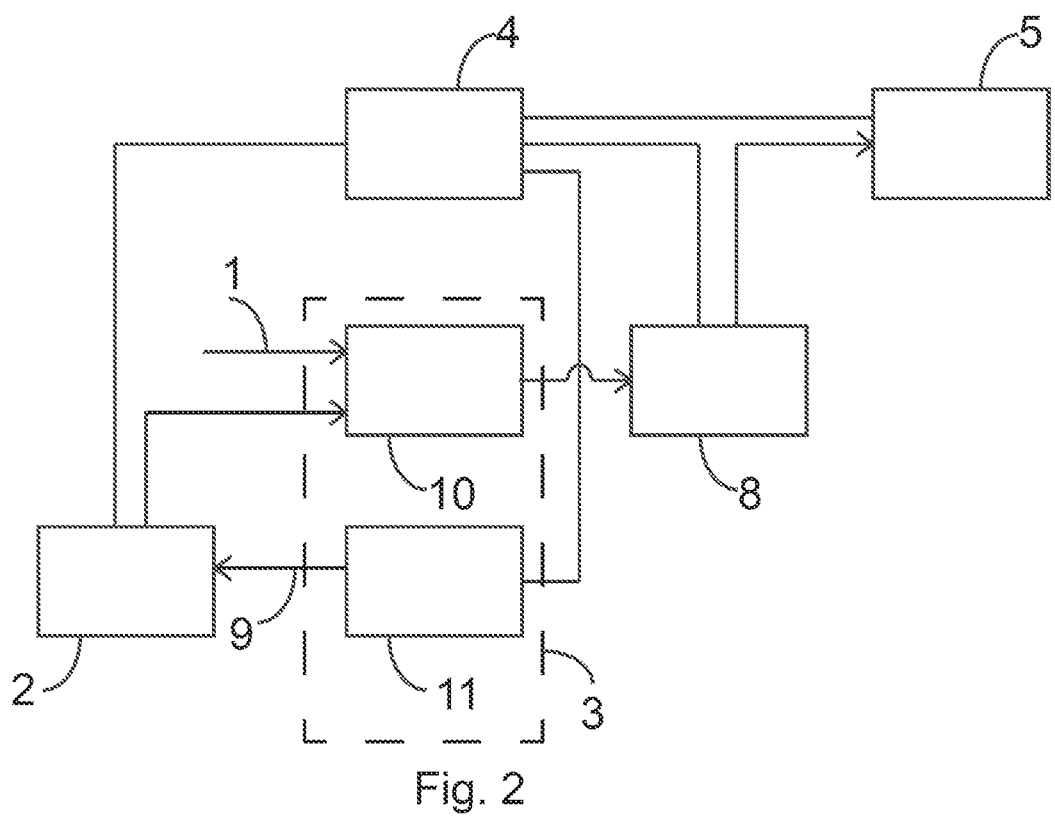
FIG. 2 shows a second particular embodiment of the system of the invention implemented with a Brillouin filter and with polarization control over the pumping signal.

FIG. 2 shows a second particular embodiment of the system and method of the invention, in which the filtering means 3 are a Brillouin filter 10 in which the signal under analysis 1 is introduced. The Brillouin filter 10 combines wavelength discrimination and polarization discrimination in one and the same element, thereby replacing both the linear polarizer 6 and the tunable filter 7. The system comprises a tunable narrow-band laser source 11 that generates a pumping signal 9. Said pumping signal 9 is introduced in the Brillouin filter 10 at the end opposite the signal under analysis 1. The polarization transformer 2 acts on the pumping signal 9, modifying its state of polarization following a predefined series of states. For each state of polarization of the polarization transformer 2, the control means 4 synchronize the wavelength of the pumping signal 9 and the measurement of the optical power detector 8, taking a measurement of the optical power distribution in the spectral analysis range for each of said states of polarization.

The stimulated Brillouin scattering amplification is a non-linear optical effect that takes place due to the interaction of a first signal (pumping signal) and a second signal (test signal) that are propagated in opposite directions in optical means, such as an optical fiber for example. With a sufficient degree of coherence of the signals, the test signal is amplified in a narrow spectral range. For example, the bandwidth of the Brillouin effect is about 0.08 pm in the near infrared around a wavelength determined by the pumping signal, with a slight Doppler shift. By modifying the wavelength of the pumping signal, a scanning which allows measuring the optical spectrum of the test signal with high resolution can be performed.

It should be considered that the efficiency of the Brillouin effect is inversely proportional to the effective area of the interacting light beams, so it is advisable to use optical fibers with a small core size, such as "dispersion-shifted" fibers for example. The maximum yield is also obtained for optical fiber lengths of the order of kilometers.

The efficiency of the Brillouin effect also depends on the relation between the polarizations of the pumping signal and the test signal, maximum efficiency being when both polarizations are parallel and minimum efficiency being when they are orthogonal. This allows combining spectral selectively with polarization discrimination in one and the same Brillouin filter and therefore performing spectral filtering dependent on the polarization of the method and system of the invention.

Given that a rotary linear polarizer is not used in this case, but rather polarization discrimination of the Brillouin filtering, the spectra corresponding to the six desired projections are obtained with six output states of polarization of the polarization transformer. For example, when considering the described projections $P_i[a,b]$, where a is the angle in degrees of the delay plate $\lambda/2$ and b the angle of the delay plate $\lambda/4$, a possible combination would be:

$P_1=[0,0]; P_2=[45,0]; P_3=[0,45]; P_4=[0,135]; P_5=[22.5,0]; P_6=[67.5,0];$

The implementations of the invention comprising a Brillouin filter 10 are particularly suitable for taking measurements with high spectral resolution. Signals the spectra of which have very pronounced power peaks, such as for example amplitude modulated signals or signals with short and repetitive patterns, can be resolved also due to the high selectively of the Brillouin filter 10. In other systems in the state of the art, the influence of said power peaks alters the final measurement of SOP of the wavelengths close to the filter, whereas in the present invention the peaks are more precisely limited, affecting a much smaller wavelength range, whereas their effect is eliminated from the remaining wavelengths outside the spectral width of the filter.

Figure 3:
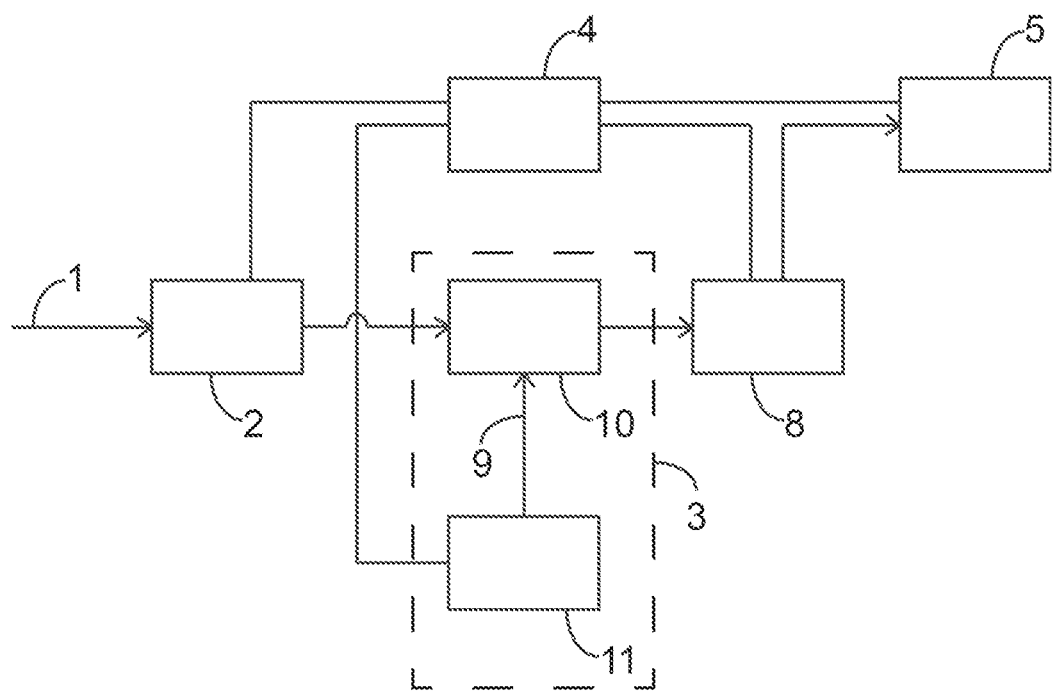
FIG. 3 shows a third particular embodiment of the system of the invention implemented with a Brillouin filter and with polarization control over the signal under analysis.

FIG. 3 shows a variant of the system and method based on Brillouin filtering in which polarization control is applied to the signal under analysis 1. The pumping signal 9 from the laser source 11 is therefore introduced with a fixed polarization in the Brillouin filter 10, whereas the signal under analysis 1 is connected to the polarization transformer 2. The different states of polarization for which the spectrum of the signal under analysis 1 is measured are therefore applied directly to the actual signal under analysis 1.

The operative basis of spectral filtering is equivalent to the previous case because the power of the optical output signal depends on the relation between the polarization of the signal under analysis 1 at the input of the Brillouin filter 10, which is sequentially modified, and the (in this case fixed) polarization of the pumping signal 9, which is stable throughout the entire process. The output states of polarization of the polarization transformer 2 are the same as in the case in which said polarization transformer 2 acts on the pumping signal 9.

Brillouin filtering in which two pumping signals in independent fibers are used, the two pumping signals having orthogonal polarizations, is also contemplated within the scope of the invention. The system therefore comprises either two Brillouin filters 10 in parallel, two optical power detectors 8 connected to said Brillouin filters 10, and a splitter that splits the power of the signal under analysis 1 between the two Brillouin filters 10; or a single Brillouin filter 10 and a control element that chooses which of the two signals with orthogonal polarizations will be introduced in the Brillouin filter 10.

It must be observed that it is also possible to implement this system of two fibers by splitting the signal under analysis 1 in two optical fibers, and performing on said optical fibers the polarization modification so that the polarization of the two split signals is orthogonal. Again, it is possible to include either one or two Brillouin filters according to that described in the preceding paragraph.

Figure 4:
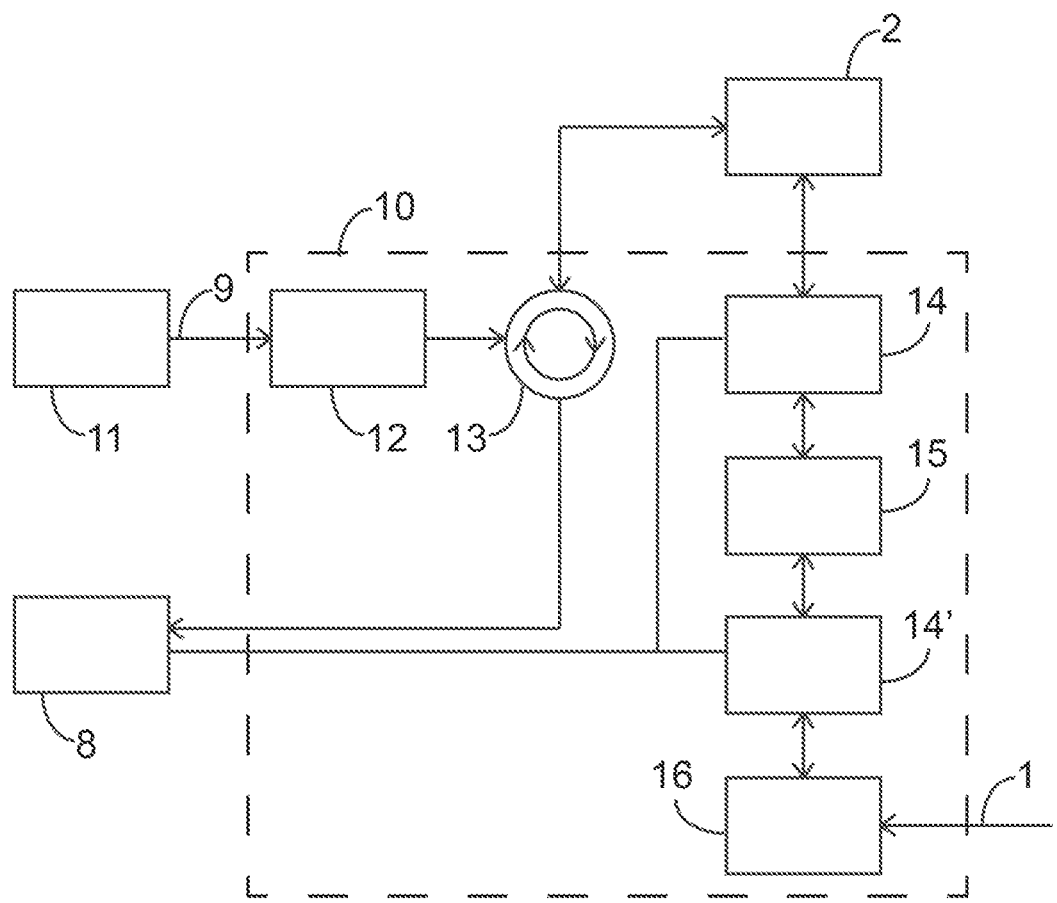
FIG. 4 shows a more detailed diagram of a Brillouin filter according to a particular embodiment of the invention.

FIG. 4 shows in greater detail a preferred implementation of a Brillouin filter 10 which allows implementing the described invention. Filtering by means of Brillouin effect takes place in an optical fiber 15 in which the signal under analysis 1 and the pumping signal 9 are introduced in a counterpropagating arrangement. The pumping signal 9 is preferably introduced through an optical amplifier 12, which increases the power of said pumping signal 9, increasing the Brillouin effect gain produced in the reel of fiber 15. Once amplified, the pumping signal 9 is connected with a 3-port optical circulator 13, such that the pumping signal 9 exits the optical circulator 13 towards the polarization transformer 2, in turn connected to a first end of the optical fiber 15. The signal under analysis 1 is introduced in the optical fiber 15 at a second end, opposite the pumping signal 9. The filter preferably comprises an isolator 16 at the input of said second end which allows the passage of the signal under analysis 1 while at the same time preventing the output of the pumping signal 9 in the direction from where the signal under analysis 1 comes.

The Brillouin filter 10 can also comprise one or more amplitude modulators 14, 14', which allow using synchronous detection in the measurement process, increasing the degree of sensitivity of the measurement. In that case, the modulator (or modulators) 14, 14', is synchronized with the optical power detector 8.

It must be observed that other arrangements of the elements forming the filter are possible within the framework of the invention as long as the counterpropagating character of the signal under analysis 1 and the pumping signal 9 is maintained. The filter has also been described with the polarization transformer 2 at the end of the reel of fiber 15 corresponding to the pumping signal 9, behind the optical circulator 13. Nevertheless, it is also possible to locate said polarization transformer 2 at the end corresponding to the signal under analysis 1, or at the input of the optical circulator 13, among other options comprised within the framework of the present invention as has been claimed.

In addition to the power of the optical output signal of the Brillouin filter 10, it is also possible to use the wavelength-resolved phase information of the signal under analysis 1. The phase information is obtained in a preferred embodiment of the system and method of the invention by means of beating two amplified components of the signal under analysis 1. The electrical signal resulting from the beating provides information about the phase of the optical signal under analysis 1. This phase measurement is repeated sequentially for the multiple output states of polarization of the polarization transformer 2 previously described. The state of polarization of the signal under analysis 1 is then reconstructed in the evaluation means 5 from said phase measurements.

The measurement is particularly reconstructed from the phase difference between perpendicular polarizations of the signal under analysis 1. In other words, by modulating the pumping signal 9, a signal with two power peaks in its spectrum (i.e., a double point), which is used for amplifying two spectral components of the signal under analysis 1, is obtained. An electrical signal with a main frequency which is the difference between both components and a phase determined by the phase difference between said components is obtained by means of detecting the interference between said spectral components.

To perform the phase measurement, the system also comprises a polarizer, for example a linear polarizer, that filters the optical signal before detection, keeping the polarization transformer 2 on either the signal under analysis 1 or the pumping signal 9.

It must be observed in this case that the detection is based on recording the phase difference between the two components, not on the absolute value thereof. Furthermore, for variable spectrum signals, the system is preferably performed by measuring the two polarizations simultaneously, i.e., a beam splitter which isolates and splits two orthogonal polarizations, is used and both polarizations are detected simultaneously. In that case, the polarization splitter acts as a polarization filter, and the step of detecting interference between the components comprises two detection elements in parallel.

In view of this description and drawings, the person skilled in the art will understand that the invention has been described according to several preferred embodiments thereof but that multiple variations can be introduced in said preferred embodiments without departing from of the object of the invention as it has been claimed.

The invention claimed is:

1. A system for measuring a wavelength-resolved state of polarization of an optical signal under analysis (1), comprising:
    tunable spectral filtering means (3) with an optical output dependent on an input polarization of the spectral filtering means (3);
    a polarization transformer (2) connected to an input of the spectral filtering means (3);
    an optical power detector (8) connected to the optical output of the spectral filtering means (3);
    control means (4) connected to the spectral filtering means (3), to the polarization transformer (2) and to the optical power detector (8), said control means (4) being configured for sequentially selecting pluralities of output states of polarization of the polarization transformer (2), and for synchronizing in the spectral filtering means (3) and the optical power detector (8) measurements of a plurality of spectral power distributions associated with the plurality of output states of polarization of the polarization transformer (2);
    and evaluation means (5) that calculates the wavelength-resolved state of polarization of the signal under analysis (1) from the plurality of measured spectral power distributions.

2. A system according to claim 1, characterized in that the spectral filtering means (3) comprise a polarizer (6) and an optical homodyne filter (7), the output of the polarizer (6) being connected to the input of the optical homodyne filter (7).

3. A system according to claim 1, characterized in that the spectral filtering means (3) with an input polarization-dependent gain comprise:
    a tunable laser source (11) configured for generating at least one variable wavelength pumping signal (9);
    a filter based on stimulated Brillouin scattering amplification (10) configured for filtering the signal under analysis (1) by means of stimulated Brillouin scattering amplification, induced by the at least one pumping signal (9);
    and in that the optical power detector (8) is configured for measuring the output power of the filter based on stimulated Brillouin scattering amplification (10) as a function of the wavelength of the at least one pumping signal (9).

4. A system according to claim 3, characterized in that the polarization transformer (2) is configured for modifying the output state of polarization of the input signal (1).

5. A system according to claim 3, characterized in that the polarization transformer (2) is configured for modifying the output state of polarization of the at least one pumping signal (9).

6. A system according to claim 5, characterized in that the spectral filtering means (3) comprise two optical fibers connected to the polarization transformer (2), the two optical fibers being configured for transporting two pumping signals (9) with orthogonal polarizations.

7. A system according to claim 3, characterized in that the filter based on stimulated Brillouin scattering amplification (10) in turn comprises:
    a reel of optical fiber (15), the signal under analysis (1) and the pumping signal (9) being coupled through opposite ends of the reel of optical fiber (15) by means of a circulator (13);
    an optical amplifier (12) suitable for amplifying the pumping signal (9);
    and an isolator (16) suitable for allowing the input of the signal under analysis (1) in the filter based on stimulated Brillouin scattering amplification (10), and preventing the output of the pumping signal (9).

8. A system according to claim 3, characterized in that it comprises phase measurement means configured for measuring a wavelength-resolved phase of a signal obtained by beating two amplified components at the output of the filter based on stimulated Brillouin scattering amplification (10), and in that the evaluation means (5) are configured for calculating the wavelength-resolved state of polarization of the signal under analysis (1) from said phase measurement for a plurality of output states of polarization of the polarization transformer (2).

9. A system according to claim 8, characterized in that the phase measurement means comprise a beam splitter according to polarization, connected to the output of the filter based on stimulated Brillouin scattering amplification (10), and two outputs of the beam splitter being connected to two detectors; and in that each detector is configured for generating two electrical signals the phase of which is determined by the relative phase between the two amplified components.

10. A system according to claim 3, characterized in that the evaluation means (5) are configured for eliminating power peaks of the spectrum of the signal under analysis (1) from the calculation of the wavelength-resolved state of polarization.

11. A method for measuring a wavelength-resolved state of polarization of an optical signal under analysis (1), which comprises:
  sequentially selecting a plurality of output states of polarization of a polarization transformer (2), said polarization transformer (2) being connected to an input of spectral filtering means (3) with an optical output with gain dependent on an input polarization of the spectral filtering means (3);
  measuring a plurality of spectral power distributions associated with the plurality of output states of polarization of the polarization transformer (2) by means of the spectral filtering means (3) and an optical power detector (8) connected to the optical output of said spectral filtering means (3);
  calculating the wavelength-resolved state of polarization of the signal under analysis (1) from the plurality of measured spectral power distributions.

12. A method according to claim 11, characterized in that the step of measuring a plurality of spectral power distributions in turn comprises for each output state of polarization:
  sequentially discriminating two orthogonal linear polarizations of the signal under analysis (1) by means of a polarizer (6);
  and measuring the spectral power distribution associated with the discriminated polarization by means of an optical homodyne filter (7).

13. A method according to claim 11, characterized in that the step of measuring a plurality of spectral power distributions in turn comprises:
  generating at least one variable wavelength pumping signal (9) by means of a tunable laser source (11);
  filtering the signal under analysis (1) by means of stimulated Brillouin scattering amplification with the at least one pumping signal (9);
  measuring the power of the filtered signal as a function of the wavelength of the at least one pumping signal (9).

14. A method according to claim 13, characterized in that the step of sequentially selecting a plurality of output states of polarization of a polarization transformer (2) comprises modifying the output state of polarization of the input signal (1).

15. A method according to claim 13, characterized in that the step of sequentially selecting a plurality of output states of polarization of a polarization transformer (2) comprises modifying the output state of polarization of the at least one pumping signal (9).

16. A method according to claim 15, characterized in that the step of measuring a plurality of spectral power distributions comprises generating two pumping signals (9) with orthogonal polarizations, and measuring a plurality of spectral power distributions for each pumping signal (9).

17. A method according to claim 11, characterized in that it further comprises:
  measuring a wavelength-resolved phase of a beat signal between two spectral components obtained as a result of the stimulated Brillouin scattering amplification of the signal under analysis (1) and the at least one pumping signal (9);
  calculating the wavelength-resolved state of polarization of the signal under analysis (1) from the wavelength-resolved phase measured for a plurality of output states of polarization of the polarization transformer (2).

18. A method according to claim 17, characterized in that the step of measuring a wavelength-resolved phase further comprises splitting the output signal of the stimulated Brillouin scattering filtering into two beams with orthogonal polarizations, and measuring the relative phase of the two amplified spectral components in each beam.

19. A method according to claim 11, characterized in that the step of calculating the wavelength-resolved state of polarization of the signal under analysis (1) comprises eliminating power peaks of the spectrum of the signal under analysis (1) from the calculation of the wavelength-resolved state of polarization.

* * * * *